United States Patent [19]

Rousseau

[11] 4,407,148
[45] Oct. 4, 1983

[54] KEY HOLDER

[76] Inventor: Jean P. Rousseau, 98 Rue de Miromesnil, 75008 Paris, France

[21] Appl. No.: 245,416

[22] Filed: Mar. 19, 1981

[30] Foreign Application Priority Data

Jun. 27, 1980 [FR] France ................................ 80 14464

[51] Int. Cl.³ ...................... A44B 13/00; A44B 15/00; A47G 29/10
[52] U.S. Cl. .................................. 70/456 R; 24/3 K; 24/241 SL; 70/459
[58] Field of Search ................. 70/456 R, 456 B, 459, 70/58, 61; 24/3 K, 201 C, 201 TR, 201 LP, 241 SL, 241 PS, 238, 239, 242, 231; 150/40; 206/38

[56] References Cited

U.S. PATENT DOCUMENTS

| 293,693 | 2/1884 | West | 70/459 |
|---|---|---|---|
| 2,254,873 | 9/1941 | Prestinari | 24/241 SL |
| 2,307,808 | 1/1943 | Segal | 24/241 SL |
| 3,704,605 | 12/1972 | Leopoldi et al. | 70/456 R |
| 4,314,467 | 2/1982 | Arvan | 70/456 R |

FOREIGN PATENT DOCUMENTS

| 829311 | 3/1938 | France | 24/241 SL |
|---|---|---|---|
| 861308 | 10/1940 | France | 24/239 |

Primary Examiner—Thomas J. Holko
Assistant Examiner—Lloyd A. Gall
Attorney, Agent, or Firm—Beveridge, DeGrandi and Kline

[57] ABSTRACT

A key holder has a rigid gapped ring 1, having a gap which is defined between two mutually facing tips, a thin-walled metal sheath 2 having, near one end, two transverse slots or apertures of asymmetric form permitting the transverse introduction of the tips 4 of the ring 1 from one side only of the sheath 2, i.e. the front side as seen in the drawing, and a slide 3 which is longitudinally slidable inside the sheath 2 and comprises at the position of each of the apertures 5 locking ribs situated on that side of the apertures 5 from which the tips 4 are introduced. The locking ribs partially mask the apertures to prevent the tips 4 from being removed when the slide 3 is slid into a closing position in which it is entirely housed inside the sheath 2. The slide is slidable downwards in the sheath to an opening position in which the ribs are clear of the slots or apertures to enable the ring to be removed and enable keys to be fitted to it or removed from it through the gap between the tips 4.

7 Claims, 4 Drawing Figures

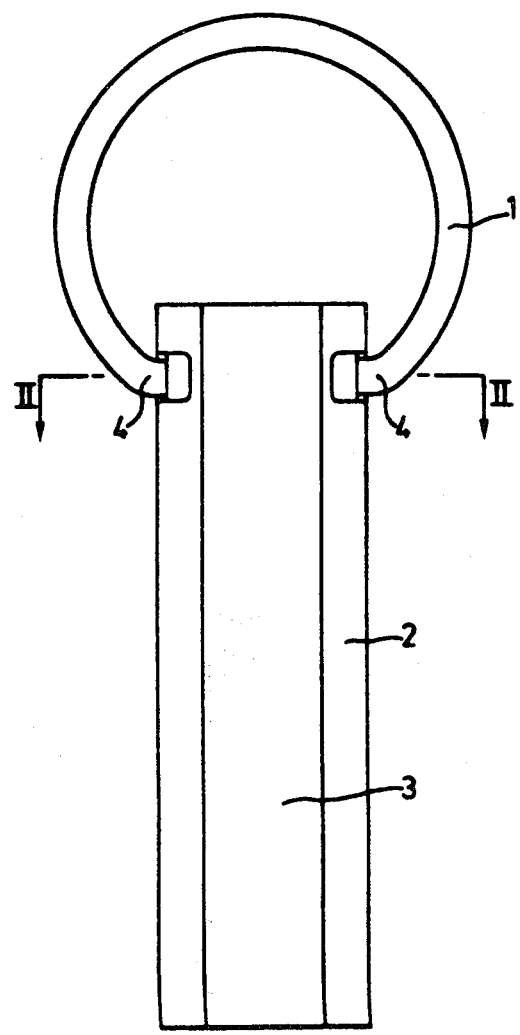

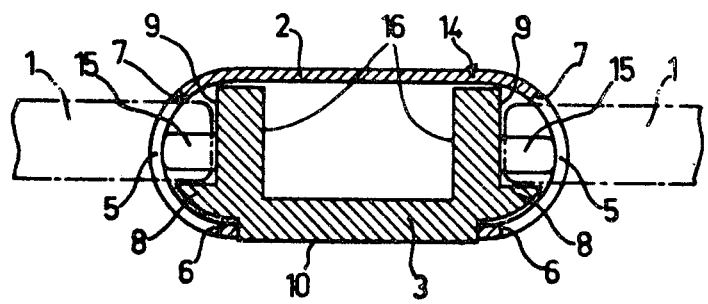
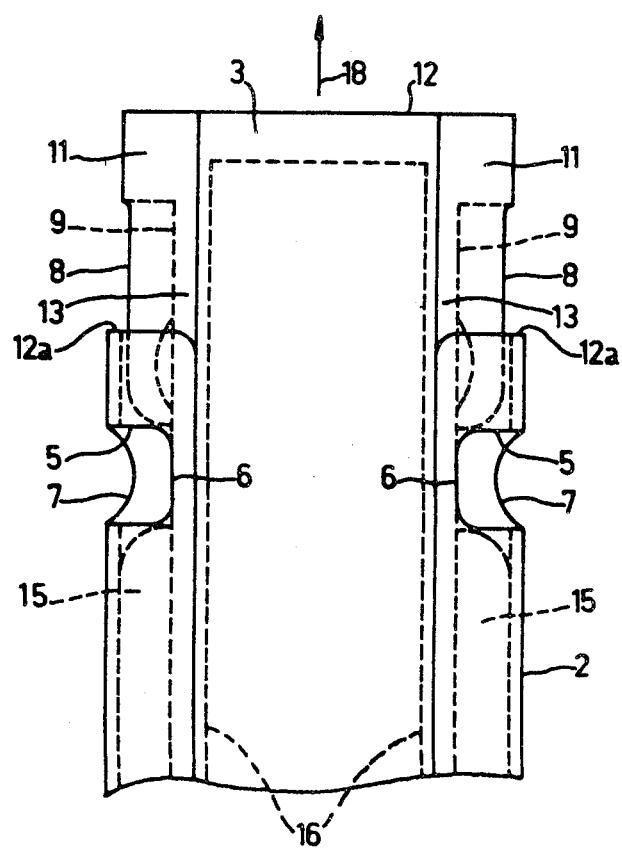

KEY HOLDER

This invention relates to key holders or rings.

Most existing key holders, in spite of having an appearance which is intended to be attractive, are constructed as articles of hardware using rudimentary metal components which are difficult to fit together and which leave a large number of rough portions which can tear the clothing pockets in which the holders are kept. They are more often than not difficult to operate, requiring the user to employ his or her fingernails to fit keys to the holder with consequent risk of broken nails. The locking of the key holder to hold the keys in position usually makes use of the resilience of at least one not very elastic and sometimes rather inaccurate metal component, the hardness of which is excessive when it is first used and then becomes inadequate after a period in use. There are of course also key holders constructed as precision mechanisms, or as pieces of jewelry, but they are extremely expensive and sometimes heavy, which mitigates against their general use.

The object of the present invention is to overcome these disadvantages, that is to say to provide a simple and economical key holder which is nevertheless effective, robust and of tidy appearance without parts likely to cause damage, while at the same time being easy to operate to fit keys to and remove keys from the holder.

According to this invention, a key holder comprises a rigid gapped ring having a gap which is defined between two mutually facing tips, a thin-walled metal sheath provided near one end with two transverse apertures of asymmetric form which permits the transverse introduction of the tips into the apertures from one side only of the sheath so that the sheath then bridges the gap, and a slide which is longitudinally slidable in the sheath and comprises two locking ribs, the slide being slidable in the sheath between an opening position, in which the ribs are clear of the apertures to permit the tips to be introduced into and removed from the apertures to allow keys to be fitted on to and removed from the ring, and a closing position in which the ribs are situated at the side of the apertures through which the tips are introduced and removed and partially mask the apertures to prevent the tips being removed from the apertures so that the ring is closed by the sheath and any keys fitted to the ring are kept on the ring.

The slide is preferably formed of moulded plastic material with an external head at each end. The head has a cross-section which substantially fills that of the sheath and terminates in an end face which is flush with the end edge of the sheath when the slide is in the closing position. The sheath is perferably of C-shaped cross section of generally flat form with a central opening extending longitudinally along one side, and the slide has a portion which fits in the central opening, this portion having a face which is flush with the external face of the side of the sheath which has the opening. The slide may advantageously have a recess which is open towards the side of the sheath remote from the central opening so as to constitute a box when the slide is in the closing position.

An example of a key holder in accordance with the invention is illustrated in the accompanying drawings in which:

FIG. 1 is a front view of the key holder with the slide in the closing position;

FIG. 2 is an enlarged sectional view along the line II—II of FIG. 1, without the ring;

FIG. 4 is a partial front view, also enlarged, of one end of the assembly comprising the sheath and the slide, the slide being in its opening position.

Figure 3:
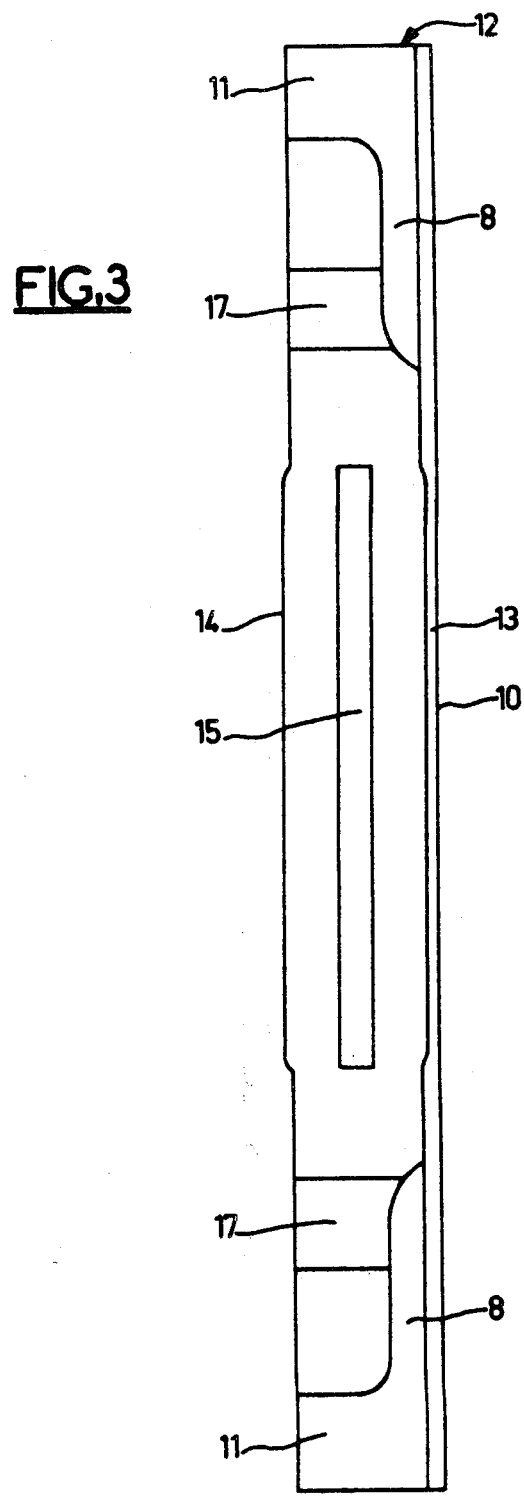
FIG. 3 shows, also enlarged, a side view of the slide alone.

As can be seen in FIG. 1, the key holder comprises three components, that is a rigid gapped ring 1, a sheath 2 and a slide 3 which is slidable inside the sheath.

The rigid ring 1, which is preferably formed of metal, comprises a wide gap defined between two tips 4 which face each other and preferably are composed of short, rectilinear cylindrical portions aligned with each other. The term rigid ring is here intended to mean a component for which no elasticity at all is essential and which can therefore be as robust as necessary.

The thin-walled, metal sheath 2 may be of tubular form, but for reasons of convenience in manufacture and operation, it is preferably of open section, with rounded sides avoiding any sharp corners. For example, the C-shaped section shown in FIG. 2 is formed of two semi-circles connected together by common tangents. One of these tangents is almost entirely eliminated by the central opening formed in one face.

Near one end, the sheath comprises apertures 5, either slots or notches, leading into the central opening of the C-shaped section. Preferably, as shown in the drawings, these apertures are of closed shape so that no damaging roughness remains in the vicinity of the central opening. In the latter case, each aperture 5 is preferably bounded, in the direction towards the central opening of the sheath, by an edge 6 which is substantially rectilinear and parallel to the axis of the sheath, and the distance between the two parallel edges 6 of the two apertures 5 is substantially equal to the distance between the two mutually opposite end faces of the two tips 4 of the ring 1, in such a manner as to permit the tips to be introduced into the apertures by a movement perpendicular to the plane of FIGS. 1 and 4. By contrast, the opposite edge 7 of each aperture 5 is situated much further from the centre line of the sheath in order to ensure that the tips 4 are retained at the opposite side of the sheath. The position of the tips 4 is indicated in chain-dotted lines in FIG. 4.

The slide 3, which is preferably made from moulded plastics material, is slidable longitudinally inside the sheath 2, and it comprises, at the position of each aperture 5 of the sheath, a locking rib 8 which ensures that the tips 4 are retained in the aperture at the side of the edges 6 when the slide is in its closing position. By axial sliding of the slide inside the sheath, the ribs 8 can disengage or expose the tips to permit the tips to be extracted from the apertures 5 perpendicularly to the plane of FIGS. 1 and 4.

In the entirety of the zone on each side of the slide affected by the position of the apertures 5 and the tips 4, the slide is preferably bounded by parallel, plane faces 9, the distance between which corresponds to the distance between the edges 6, that is to say to the gap of the ring 1. This faciliates the introduction and removal of the ring when the slide is in the opening position inside its sheath, and also prevents the ring from revolving around itself in the locked position.

The slide 3 has a slight projection throughout the entire extent of the central opening of the sheath 2, so that a flat face 10 of the slide is flush with the external surface of the sheath, that is to say it is situated on the common tangent to the two semi-cylindrical external faces of the sheath. The slide and sheath thus present a smooth appearance without any catching edges. In the same manner, at each end of the slide 3, the slide terminates in a head 11 which substantially fills the cross-section of the end of the sheath and terminates in an end face 12 which is flush with the end face 12a of the sheath when the slide is in the closing position, i.e. when the slide lies entirely within the sheath.

In order to ensure smooth sliding of the slide 3 inside the sheath 2, in spite of internal roughnesses which can exist in the apertures 5 and in the end sections 12a of the sheath and which it is always difficult to avoid completely, the central portion only of the slide, i.e. the portion which never leaves the region between the apertures 5 at one end and the end of the sheath at the opposite end, is in sliding contact with the sheath with a slight gripping pressure between the slide and sheath. All the other faces of the slide within the sheath are slightly clear of the internal surface of the sheath to prevent any catching on possible burrs or projections. This sliding contact in the central zone only is ensured in particular by narrow ledges 13 on each side of the central opening of the sheath, by bearing ledges 14 on the opposite side, and by lateral ribs 15 extending in the median plane of the slide. These ribs project beyond a plane which is a continuation of the plane 9.

Since the slide 3 is preferably made from moulded plastics material, in order to simplify manufacture, it is preferable to construct it in the form of a hollow component by forming, at its central region, a recess 16 of substantially parallelepipedic shape. The lateral faces of the recess extend between the ledges 14 and parallel to the external faces 9. The end faces of the recess extend parallel to the end faces 12, and the bottom of the recess extends parallel to the face 10. The recess is consequently open at the face of the slide which is contained by the solid side of the sheath 2. With this arrangement the parallelepipedic recess 16 becomes partially uncovered when the slide is in the opening position and can be fully uncovered after the ring has been removed in such a way that the assembly of the sheath and slide provides a box for the housing of small objects of any kind. The slide 3 may, if desired, be of transparent material.

It will be noted that, during the sliding movement of the slide 3 inside the sheath 2 from the closing position of FIG. 1 to the opening position of FIG. 4, the lateral guiding ribs 15 engage against the tips 4 of the ring. During the reverse movement, the ribs 8 readopt their closing positions for the tips 4, and the assembly can be locked in the closing position by providing each plane face 9 with a projecting boss 17 near the end of each rib 8. Each boss 17 engages with the corresponding tip 4 as the slide approaches the closing position. In this manner, the two opposite bosses produce a kind of elastic resistance to the passage of the two tips, while subsequently releasing them to permit the ring to pivot freely relative to the sheath and slide. As shown in FIG. 3, the slide can be made in an entirely symmetrical shape by providing a similar arrangement of ridges and bosses at its other end, thus eliminating the need for any special care at the time of assembly during manufacture or by the user who may take the three components apart entirely, for example to permit its use as a box.

In the example shown, the locking ribs 8 join, at their ends remote from the bosses 17, the corresponding head 11, whereby the movement of the slide which produces opening of the apertures 5 operates in the direction of the arrow 18 in FIG. 4. This can be done very easily by taking the sheath 2 in the hand and by pushing in the direction of arrow 18 with the thumb on the portion of the side situated in the central opening of the sheath. It is, of course, possible to provide face 10 with roughened regions or ridges to facilitate the grip of the thumb. It is, however, possible alternatively to provide the reverse arrangement by joining the ends of the ribs 8 to the corresponding ends of the central ribs 15. The opposite ends of the ribs 8, near the bosses 17, are then separated from the head 11 to permit the passage of the tips 4. The opening movement is then obtained by movement of the slide in the direction opposite to the arrow 18.

It will be seen that the key holder permits extremely simple assembly of only of three components which are of simple form and are relatively economical to manufacture. It also permits easy handling or operation, it exhibits a high degree of robustness, and it presents a clean external appearance, which may be entirely free of any rough edges.

I claim:

1. A key holder which comprises a rigid gapped ring having a gap which is defined between two mutually facing tips, a thin-walled metal sheath provided near one end with two transverse apertures of asymmetric form which permits the transverse introduction of the tips into the apertures from one side only of the sheath so that the sheath then bridges the gap, and a slide which is longitudinally slidable in the sheath and comprises two locking ribs, the slide being slidable in the sheath between an opening position, in which the ribs are clear of the apertures to permit the tips to be introduced into and removed from the apertures to allow keys to be fitted on to and removed from the ring, and a closing position in which the ribs are situated at the side of the apertures through which the tips are introduced and removed and partially mask the apertures to prevent the tips from being removed from the apertures so that the ring is closed by the sheath and any keys fitted to the ring are kept on the ring.

2. A key holder according to claim 1, in which the sheath is of C-shaped cross section of generally flat form with a central opening extending longitudinally along one side, and the slide is of moulded plastics material and has a portion which fits in the central opening, this portion having a face which is flush with the external face of the side of the sheath which has the opening.

3. A key holder according to claim 1, in which the slide has, at each end, a head substantially filling the entire internal cross-section of the sheath, each head having an end face which is flush with the end of the sheath when the slide is in the closing position.

4. A key holder according to any one of the preceding claims, in which the sliding contact between the slide and the sheath is limited to a central zone which is restricted longitudinally in such a manner that, in the movements of the slide relative to the sheath between the opening and closing positions, this zone never encounters internal burrs or roughnesses which may be present at the edges of the apertures and at the end edges of the sheath, all the other surface parts of the slide situated outside this central zone being slightly clear of the internal surface of the sheath.

5. A key holder according to claim 4, in which the sliding contact is limited to two lateral ledges one at each side of the central opening of the sheath, two corresponding ledges on the opposite side of the slide and two lateral median ribs.

6. A key holder according to claim 5 wherein the sheath is of C-shaped cross section of generally flat form with a central opening extending longitudinally along one side, said slide having a substantially parallelepipedic recess extending between the lateral ledges, and between the end faces, the recess being open towards the side of the sheath remote from the central opening.

7. A key holder according to claim 1 in which the faces of the slide have a projecting boss in the vicinity of that end of each of the locking ribs which is adjacent the corresponding aperture when the slide is in the opening position, said projecting boss engaging the corresponding tip of the ring to lock the slide in the closing position.

* * * * *